(12) United States Patent  
Kapur et al.

(10) Patent No.: US 9,225,631 B2  
(45) Date of Patent: Dec. 29, 2015

(54) IMPLEMENTATION OF PROTOCOL IN VIRTUAL LINK AGGREGATE GROUP

(71) Applicant: INTERNATIONAL BUSINESS MACHINES CORPORATION, Armonk, NY (US)

(72) Inventors: Ashish Kapur, Santa Clara, CA (US); Vishal Shukla, Santa Clara, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 151 days.

(21) Appl. No.: 14/060,524

(22) Filed: Oct. 22, 2013

(65) Prior Publication Data

US 2015/0110105 A1   Apr. 23, 2015

(51) Int. Cl.  
*H04L 12/709* (2013.01)  
*H04L 12/931* (2013.01)  
*G06F 9/455* (2006.01)

(52) U.S. Cl.  
CPC .......... *H04L 45/245* (2013.01); *G06F 9/45533* (2013.01); *H04L 49/70* (2013.01)

(58) Field of Classification Search  
None  
See application file for complete search history.

(56) References Cited

U.S. PATENT DOCUMENTS

| | | |
|---|---|---|
| 2011/0292931 A1 | 12/2011 | Kizawa |
| 2012/0063363 A1* | 3/2012 | Li et al. ............... 370/255 |
| 2012/0307828 A1* | 12/2012 | Agarwal et al. ........... 370/392 |
| 2014/0036675 A1* | 2/2014 | Wang et al. ............ 370/235 |
| 2015/0043581 A1* | 2/2015 | Devireddy et al. ......... 370/392 |
| 2015/0046572 A1* | 2/2015 | Cheng et al. ........... 709/220 |
| 2015/0055662 A1* | 2/2015 | Bhagavathiperumal et al. .............. 370/503 |
| 2015/0110105 A1* | 4/2015 | Kapur et al. ............. 370/389 |

* cited by examiner

*Primary Examiner* — Gary Mui  
(74) *Attorney, Agent, or Firm* — Shimokaji IP

(57) ABSTRACT

Switches in a virtual networking environment may be synchronized by providing virtual networking policies to multiple switches connected to a virtual machine. The multiple switches may form a virtual link aggregate group. Virtual networking policies corresponding to the virtual machine may be provided via packets sent to the multiple switches in the link aggregate group. In some embodiments, the packet may be sent under the IEEE 802.1Qbg protocol.

20 Claims, 6 Drawing Sheets

IMPLEMENTATION OF PROTOCOL IN VIRTUAL LINK AGGREGATE GROUP

BACKGROUND

The present invention relates to network implementation and, more specifically, to an implementation of a protocol to multiple switches in a virtual line aggregate group (LAG).

In many data center environments, downstream servers or switches may connect to upstream devices using uplinks, which may consolidate traffic. For example, a server or a switch may be connected to more than one switch in the aggregation layer to provide for network redundancy. Typically, a Spanning Tree Protocol (RSTP, PVRST, or MSTP) may be used to prevent broadcast loops and block redundant uplink paths. This may have the undesirable result of reducing the available bandwidth between the layers by as much as 50%. In addition, the STP may be slow to resolve topology changes that occur during a link failure or failover scenario. The STP may not for example, be able to resolve differences in switch states among redundant switches. The information transferred from both switches may be inconsistent and thus a failover may result in considerable media access control (MAC) address flooding in a server as both switches attempt to update the server.

Using Virtual Link Aggregation Groups (vLAGs), redundant uplinks may remain active utilizing all available bandwidth. In a vLAG, two switches may be paired as vLAG peers and may act as a single virtual entity for establishing a multi-port trunk. Ports from both peer switches may be grouped into a vLAG and may be connected to the same LAG-capable target device, for example a server. From the perspective of the target device, the ports connected to the vLAG peers appear to be a single trunk connecting to a single logical device.

The 802.1Qbg/Edge Virtual Bridging (EVB) protocol is a standard designed to enable networks to be aware of the presence of virtual machines (VM). This protocol automates the exchange of information between virtual Ethernet bridges. The physical end stations which may contain the VMs may use a bridge to form a local area network (LAN). The virtual network interface card (vNIC) configuration information of a particular VM may typically be made available to the EVB enabled devices.

Conventionally, the 802.1qbg protocol may only be supported for a single uplink switch. The 802.1qbg protocol may be used to provide quality of service (QoS) and access control list (ACL) policies to communicate with VMs in a server which is connected to an adjacent bridge (switch). The 802.1qbg protocol may operate sufficiently in a connection between a server and a single uplink switch. However if the server connects to multiple uplink switches using a LAG and the uplink switches are in a vLAG configuration, the 802.1qbg protocol may not work since there is no mechanism available to synchronize the VM with association/dissociation related information among the vLAG switches.

SUMMARY

According to one embodiment of the present invention, a computer program product for synchronizing uplink switches with a virtual machine, comprises a non-transitory computer readable storage medium having computer readable program code embodied therewith. The computer readable program code is configured to negotiate a communication protocol capability between a server and a first switch and a second switch both of which are in communication with the server; identify an association of the virtual machine with the first and second switches; and provide a packet including a virtual networking policy to both the first and second switches synchronizing a virtual networking state of the first switch and the second switch with a virtual networking state of the virtual machine.

According to another embodiment of the present invention, a network system comprises a server; a first switch connected to the server; and a second switch connected to the first switch and the server, wherein the first switch and the second switch form a virtual link aggregate group and the server is configured to communicate with the first switch and the second switch under the IEEE 802.1Qbg protocol.

According to yet another embodiment of the present invention, a server comprises a hypervisor; a virtual machine defined by the hypervisor; and a processing unit configured to: associate or disassociate the virtual machine with a virtual link aggregate group link comprising multiple switches, and synchronize virtual networking policies among the multiple switches.

DETAILED DESCRIPTION

Figure 1:
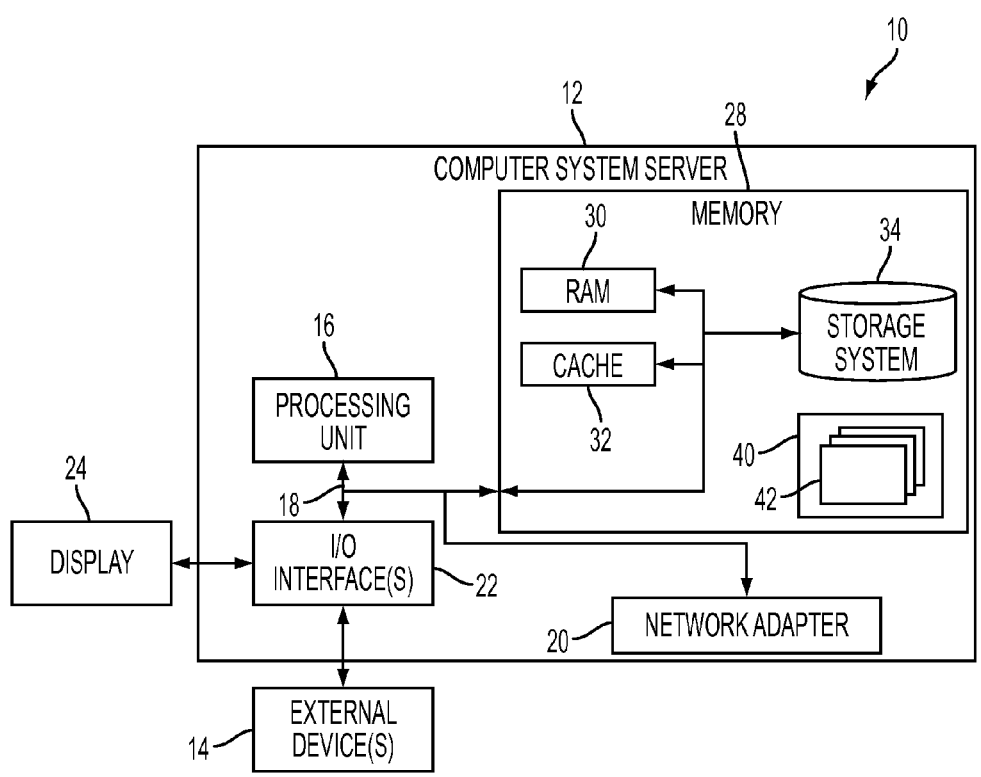
FIG. 1 depicts a cloud computing node according to an embodiment of the present invention.

In general, exemplary embodiments of the present invention may provide implementation of a protocol among multiple uplink switches. Some of the embodiments described may synchronize for example uplink switches in a virtual networking environment. The network may benefit from synchronized switches since each of the uplink switches may remain available during operation, which may provide all of the bandwidth available among switches and endpoints. In addition, synchronized switches may provide a seamless transition of data exchange from one uplink switch to another uplink switch in the event one of the switches experiences a failover.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
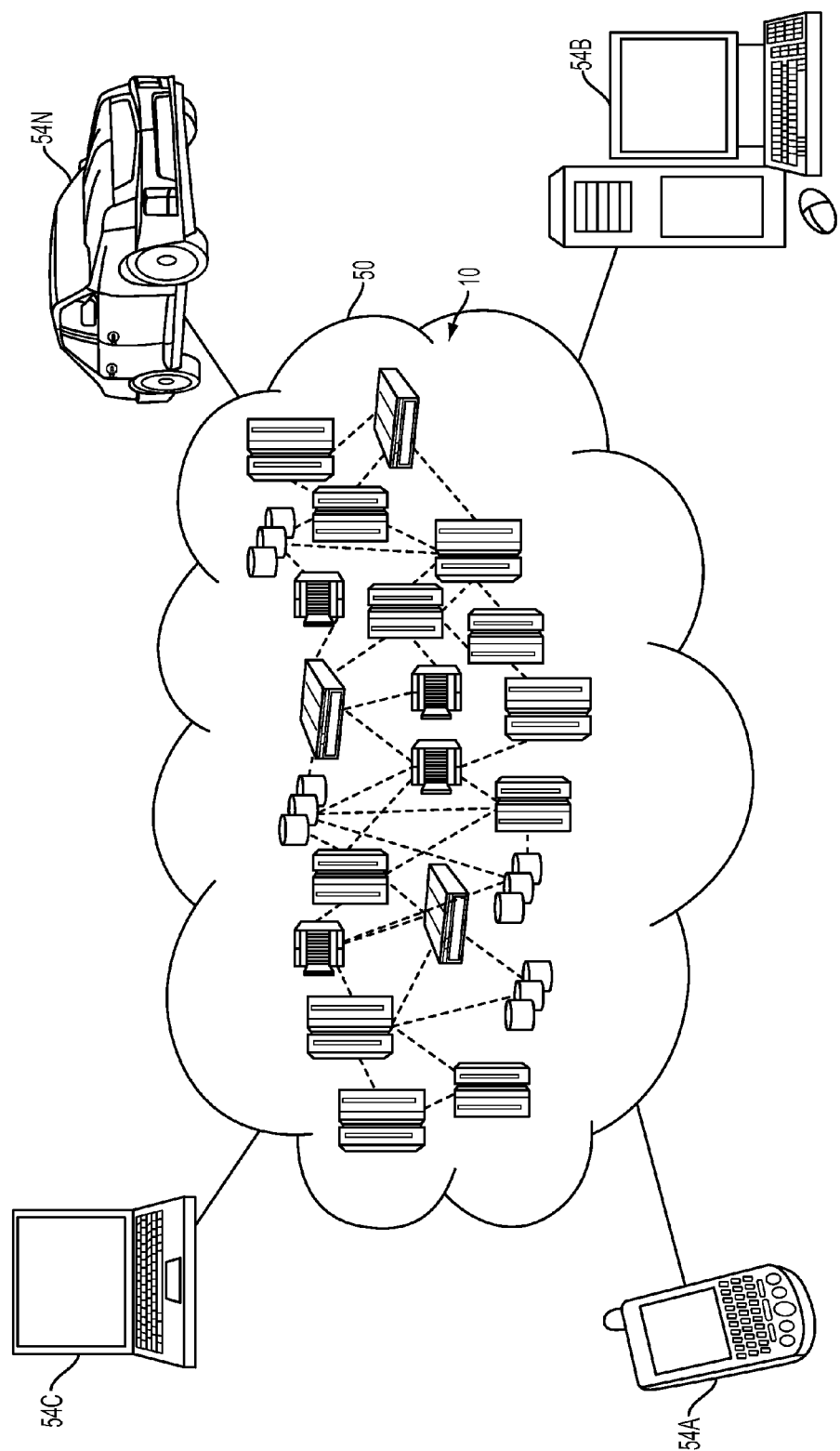
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or an automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
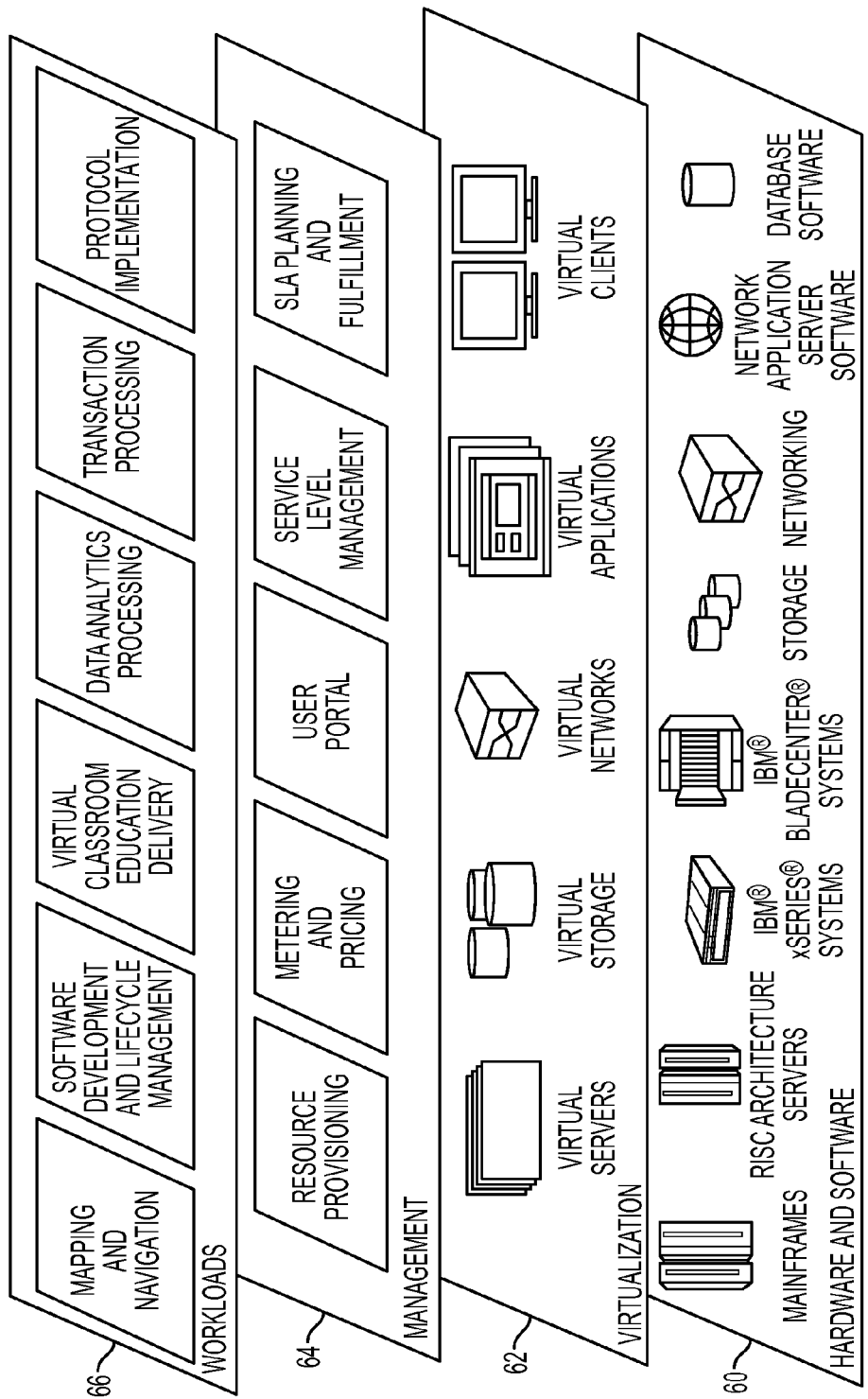
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 may provide functionality for which the cloud computing environment may be utilized. Examples of workloads and functions which may be provided from this layer include: mapping and navigation; software development and lifecycle management; virtual classroom education delivery; data analytics processing; transaction processing; and secure cloud network implementation.

The following describes implementation of an exemplary protocol for use in exemplary embodiments of the present invention. For example, the Institute of Electrical and Electronic Engineers (IEEE) 802.1Qbg protocol (referred to in general as the 802.1 Qbg protocol) may be used however it will be understood that other protocols may be available for use under exemplary embodiments of the present invention. The following is a list of protocols and associated mechanisms that may be used in association with the 802.1Qbg protocol.

Protocols and Mechanisms Used in 802.1Qbg:

Edge Control Protocol (ECP): This is a transport protocol which may operate over a LAN. The ECP protocol may provides a reliable, in-order delivery of Upper Layer protocol data units (PDUs).

Virtual Station Interface (VSI) Discovery and Configuration Protocol (VDP): The VDP protocol may allow the hypervisors to advertise VSIs to the physical network. The VDP protocol may enable the configuration of the network policies, which are applied to a particular VM. These policies may persist with the VM even though the VM may move from one physical host to another.

Virtual Ethernet Bridging (VEB) & Virtual Ethernet Port Aggregator (VEPA):

The VEB and VEPA are mechanisms, which may provide for switching between VMs on the same hypervisor. The VEB may enable switching with the server, either in the software in the form of a vSwitch, or in the hardware (for example using single root I/O virtualization capable NICs).

The VEPA may require the edge switch to support "Reflective Relay", an operation where the switch may forward a frame back to the port on which it arrived if the destination MAC address is on the same port.

EVB Type-Length-Value (TLV):

The EVB TLV is a Link Layer Discovery protocol (LLDP)-based TLV used to discover and configure VEPA, ECP, and VDP.

Figure 4:
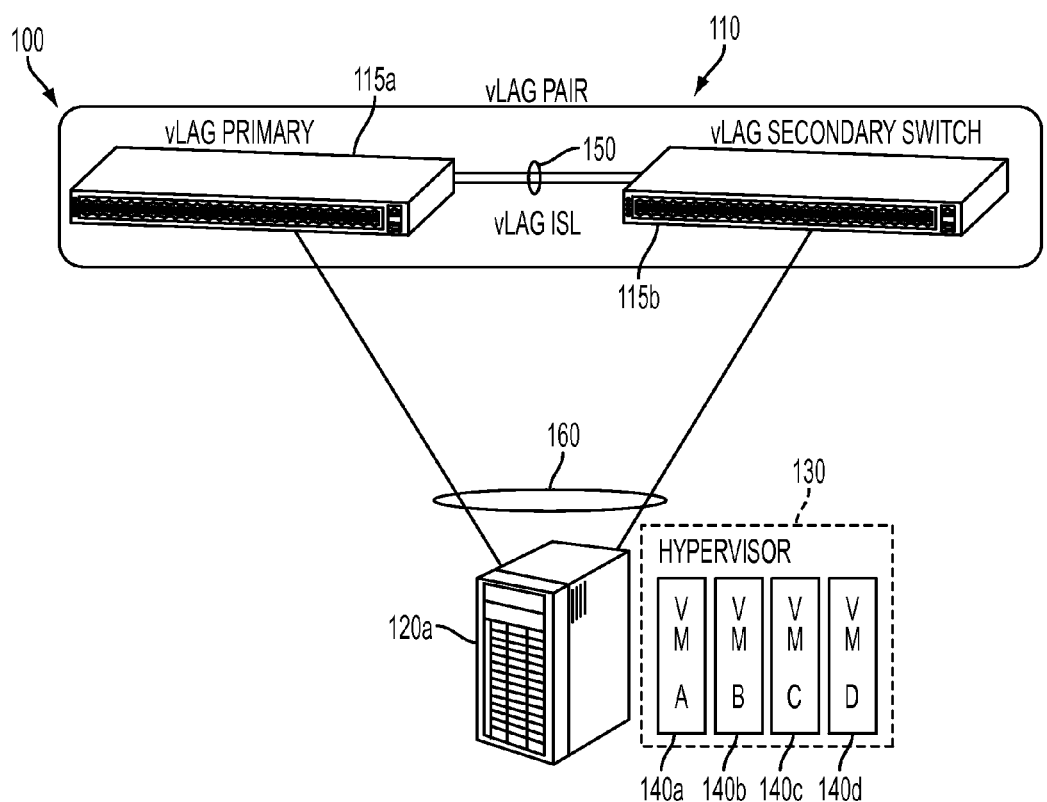
FIG. 4 is a block diagram of a system according to still another embodiment of the present invention.

Referring now to FIG. 4, a network system 100 is shown in accordance with an exemplary embodiment of the present invention. The network system 100 may include a switch point 110 connected to a server 120a (referred to in general as a server or servers 120). The server(s) 120 may be, for example, the server 12 described with respect to FIG. 1. For sake of illustration only, a single switch point 110 and server 120 are shown; however, it will be understood that more than one switch point 110 and server 120 may be present in the network system 100.

The network system 100 may provide virtual networking. The server 120a may include a hypervisor 130 defining virtual machines 140a, 140b, 140c, and 140d (referred to in general as virtual machines 140 or VMs 140). The server 120a may include a virtual station interface database (VSIdb)

(stored, for example, in the storage system 34 of FIG. 1) which may configure for each of the VMs 140: for example, vLAN information, QoS policies, ACL policies, a VSI Type ID, VSI version information, and a VSI Manager ID.

In an exemplary embodiment, the switch point 110 may include a primary switch 115a and a secondary switch 115b (referred to in general as switches 115). The switches 115 may be paired together in a virtual LAG configuration as vLAG peers, which may appear to be a single logical switch point 110 from the perspective of the server 120a. In an exemplary embodiment, both switches 115 may include the same virtual networking policies (for example, the same VSIdb information) in their respective databases. The switches 115 may communicate together along a vLAG inter-switch link (ISL) 150. In operation, the switches 115 may act together as a single virtual entity for establishing a multi-port trunk. Ports from both switches (115a and 115b) may be grouped into a vLAG association and connected to the same LAG capable target device, for example, the server 120a. From the perspective of the server 120a, the ports connected to the vLAG peers (switches 115) may appear to be a single trunk 160 connecting to a single logical device.

During formation of a connection to the switch point 110, the server 120a may check if the switch point 110 is configured as a vLAG configured pair of switches 115.

The server 120a may negotiate communication protocol capabilities between the hypervisor 130 and the primary switch 115a and the secondary switch 115b. The communication protocol may be for example the 802.1Qbg protocol. The server 120a may provide an LLDP packet configuring VEPA, ECP, and VDP information to primary and secondary switches 115a and 115b.

In an exemplary embodiment, if the primary switch 115a forms an association with or disassociates from a virtual machine 140 on the server 120a, the primary switch 115a may update its own database with the virtual networking policies—updated as a result of the newly formed association (or disassociation) with the server 120a. The primary switch 115a may send the virtual networking policies corresponding to the association with (or disassociation from) the server 120a to the secondary switch 115b through, for example, a packet including an ECP (referred to generally as the ECP packet). In an exemplary embodiment of the present invention, the ECP packet may include, for example, a configuration protocol TLV. The configuration protocol TLV may include information corresponding to the vLAG trunk formed by the association of the primary switch 115a with the server 120a. Communication between the switches 115 and the server 120a may follow, for example, the 802.1Qbg protocol. An exemplary packet format for the 802.1Qbg protocol provided in the ECP packet is shown as follows:

802.1Qbg Packet Format

ECP Packet

| EtherType | Sub-type | Mode | Sequence Number | Upper Layer PDU |
|---|---|---|---|---|
| 2 Octets | 2 Octets | 1 Octet | 2 Octets | Optional |

VSI Discovery and Configuration TLV with vLAG Elements:

The ECP packet may use a virtual station interface type-length value (VSI TLV). The VSI TLV may be used for discovery and configuration of switches 115. The VSI TLV may be exchanged between the server 120a and the switch point 110. One or more VSI TLVs may be transported in an ECP Data Unit. In an exemplary embodiment of the present invention, the VSI TLV may include the following fields. The fields in bold (vLAG Trunk, ACL Index, Local vLAG Status) represent fields which, under exemplary embodiments of the present invention, may allow vLAG peers (the switches 115) to use the VSI TLV as part of an ECP packet over the vLAG ISL 150.

| VSI TLV | | | | | | | | | | | | |
|---|---|---|---|---|---|---|---|---|---|---|---|---|
| TLV Type = 127 | TLV information string length | OUI | Sub-type | Mode | VSI Mgr ID | VSI Type ID | VSI Type Version | VSI Instance ID | MAC/VLAN Format | MAC/VLANs | vLAG Trunk | ACL Index | Local vLAG Status |
| 7 bits | 9 bits | 3 Octets | 1 Octet | 2 Octet | 1 Octet | 3 Octet | 1 Octet | 16 Octets | 1 Octet | M Octets | 1 Octet | 1 Octet | 2 bits |

The vLAG trunk information may provide identification of the vLAG trunk formed during association with the server 120a (or severed during disassociation). The ACL index may provide the access control list in the vLAG connection between the primary switch 115a and the server 120a. The local vLAG status may provide whether the connection between the switch point 110 (switch 115a and switch 115b) and the virtual machine 140 is currently in an associated state or a disassociated state.

Figure 5:
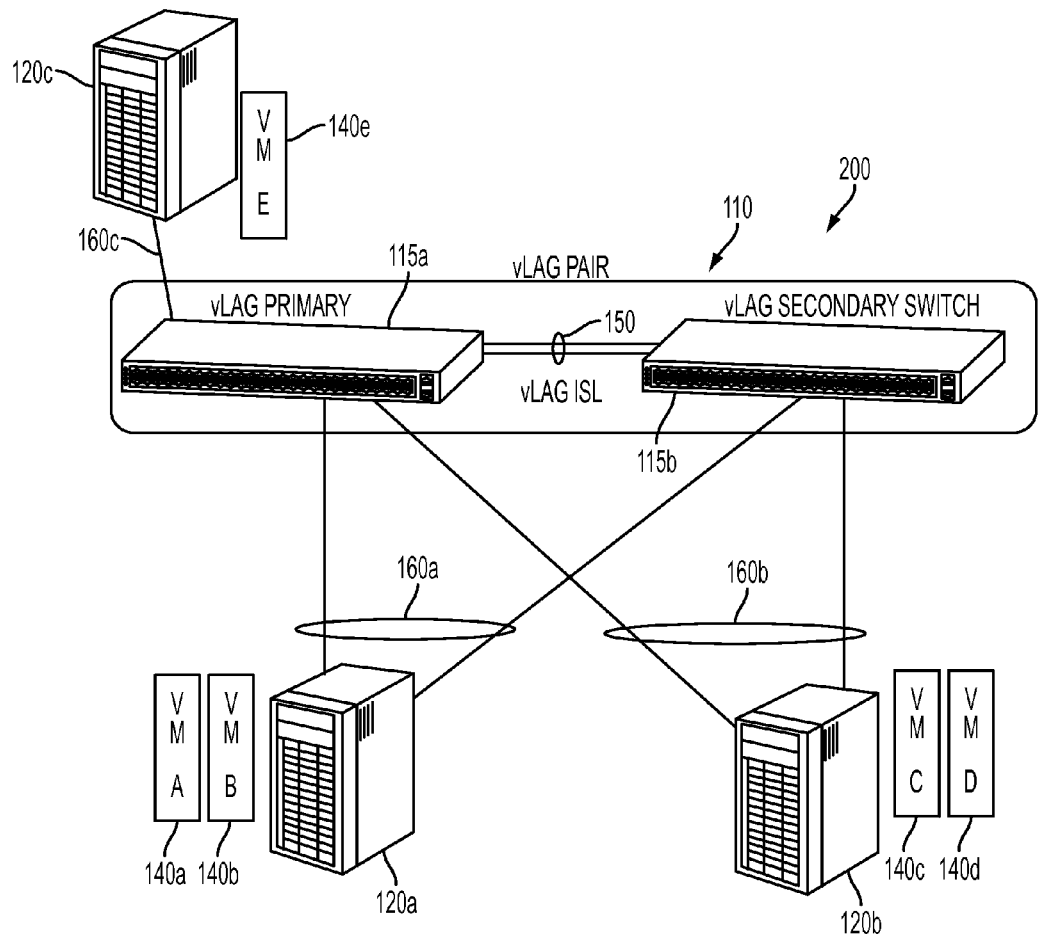
FIG. 5 is a block diagram of a system according to still another embodiment of the present invention.

Referring now to FIG. 5, a network system 200 is shown according to an exemplary embodiment of the present invention. The system 200 is similar to the system 100 except that the system 200 shows servers 120a, 120b, and 120c and the VMs 140c and 140d have migrated from the server 120a to the server 120b. A fifth VM 140e has formed an association with the server 120c.

During the formation of an association between a virtual machine 140 and a switch 115, for example between the VM 140e and the switch 115a, the association may be formed after the virtual machine's 140e VSI-type and VLAN information is verified based on information in the virtual machine's 140e VSIdb. A vLAN table may be dynamically created in hardware. The port associated with the connection of the virtual machine 140e and the switch 115a may be tagged and added in the dynamic vLAN table. In embodiments using a vLAG configured pair of switches 115, based on hashing, the ECP packet could go to either the switch 115a or 115b. For example, if the switch 115a received the ECP packet from the server 120c, the switch 115a may send the ECP packet over the ISL 150 to the switch 115b so that the association information may also be maintained in the peer switch (switch 115b). Similarly, when the switch 115a receives a disassociation message from the server 120, for example when VMs 140c and 140d disassociated from the server 120a to migrate to the server 120b, an ECP packet may be sent over the ISL 150 to get their respective entries removed from the switch 115b. The ECP packet(s) sent to the switch 115a (during either an association or disassociation event), may include the vLAG state on the port of the switch 115a where it was originally received. The ECP packet may be received on for example port "x" which may be part of a vLAG trunk "n". The ECP packet sent to the switch 115b may include the same vLAG settings as the switch 115a so that the switch 115b may use the information in the packet to form an association with or disassociate from the same trunk as the vLAG switch 115a. The following table shows exemplary VSI associations related to the virtual machine 140 provided by the ECP packet from the switch 115a to the switch 115b.

TABLE 1

VSI Associations

| TypeId | MAC | Vlan | Trunkid | TxACL | RxEntry |
|---|---|---|---|---|---|
| 1 | 00:50:56:81:39:6a | 4 | 65 | 248 | 222 |
| 1 | 00:50:56:81:39:68 | 5 | 67 | 251 | 216 |

Exemplary embodiments of the present invention may provide protection from data loss or incongruence as a result of a failover scenario by providing redundant information to paired switches 115. Once the association is formed on the primary switch 115a, the primary switch 115a may send the VDP TLV inside the ECP packet with the trunk ID of the LAG port where the association had been formed and the ACL Index. The secondary switch 115b may install this information into its table to form the association entry. Similarly, the virtual machine 140c may have formed an association with the primary switch 115a and the virtual machines 140a and 140c may pass traffic through the switch point 110. During the association of the virtual machine 140c with the switch point 110, the link between the virtual machine 140a and the primary switch 115a may be interrupted. The association information on the primary switch 115a may move to the ISL trunk. This may allow a host or VM 140 which is sitting directly on one of the switches 115 (for example, the virtual machine 140e) to send traffic to the virtual machine 140a. The traffic may flow over the ISL 150 to the secondary switch 115b and from the link between the secondary switch 115b to the server 120a which hosts the virtual machine 140a. Since the secondary switch 115b may have an association entry, any traffic from the virtual machine 140c towards the virtual machine 140a may reach either the primary switch 115a or the secondary switch 115b. If the traffic reaches primary switch 115a, the traffic may go over the ISL 150 to the secondary switch 115b, and from the secondary switch 115b to the server 120a that hosts virtual machine 140a. If the traffic reaches the secondary switch 115b, the packet may directly go to the server 120a that hosts virtual machine 140a.

In the event a virtual machine 140 (for example 140c) needs to migrate to a different physical server 120 (for example from the server 120a to the server 120b), the virtual machine 140c may disassociate from the switches 115a and 115b. The ECP packet may be sent from the server 120a to the switch 115a. Upon receipt of the ECP packet, the switch 115a may disassociate the virtual machine 140c from the switch point 110. The ECP packet may include the vLAG settings for the virtual machine 140c which may be removed from the peer switch 115b database. Thus, both the switch 115a and the switch 115b may be synchronized in disassociating from the virtual machine 140c until the virtual machine 140c forms a new association with the server 120b.

Figure 6:
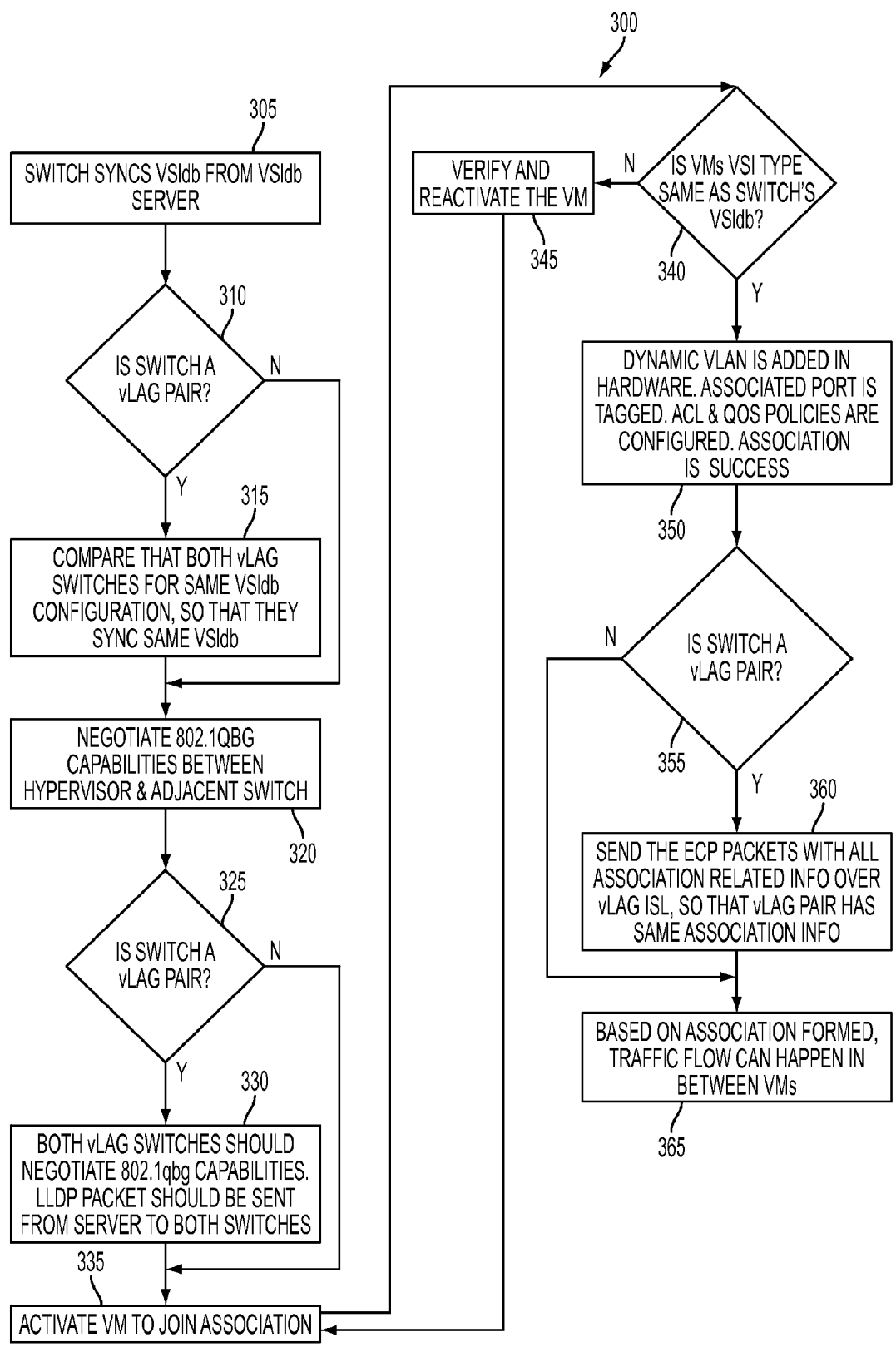
FIG. 6 is a flowchart of a method of synchronizing uplink switches with a virtual machine according to yet another embodiment of the present invention.

Referring now to FIG. 6, a method 300 of synchronizing uplink switches with a virtual machine is shown in accordance with an exemplary embodiment of the present invention. The method 300 may be used for example in the aforementioned systems 100 and 200. Actions described in the following blocks may be performed for example, by the processing unit 16 (FIG. 1).

In block 305, the processing unit may synchronize a switch point's virtual networking policies (for example VSIdb information) with virtual networking policies in the server the switch point is in association with.

In block 310, the processing unit may determine if the switch point is a vLAG configured pair of switches. If the switch point is a vLAG pair of switches, then the processing unit may in block 315 compare the virtual networking policies of the first switch to the virtual networking policies of the second switch in the vLAG pair for synchronization.

In block 320, the processing unit may negotiate communication protocol capabilities between the hypervisor on the server and the first switch in the switch point. The communication protocol may be for example the 802.1Qbg protocol. In block 325, the processing unit may determine if the switch point is a vLAG pair of switches. If the switch point is a vLAG pair of switches, then the processing unit may in block 330 also negotiate the communication protocol capabilities for the second switch. The server may send a LLDP packet to both the first and second switch. Thus both switches in the vLAG pair may learn about the 802.1Qbg protocol capabilities from the server.

In block 335, the processing unit may activate a virtual machine to form an association with the vLAG pair of switches. In block 340, the processing unit may determine if the virtual machine's VSI type is the same type as the VSIdb of the switches in the vLAG pair. If not, then the processing unit may in block 345 verify the settings in the virtual machine and activate the virtual machine in block 340. If the determination in block 340 is affirmative, then the processing unit may in block 350 configure the association of the virtual machine with the vLAG pair of switches by adding a dynamic VLAN created dynamically in hardware. The associated port (s) of the association may be tagged and added to the dynamic vLAN.

In block 355, the processing unit may determine if the switch point is a vLAG pair of switches. If not, the method 300 may return to block 335. If the switch point is a vLAG pair of switches, then the processing unit may in block 360 send an ECP packet to either of the vLAG switches. The ECP packet may be sent to either switch based on hashing. The vLAG switch which received the ECP packet may send the packet over the ISL to the vLAG switch peer so that the association information is also maintained in the peer switch. Similarly, when the switch receives a dissociation message, there should be a packet sent over the ISL to get the entry removed from the peer vLAG switch. The ECP packet sent to the vLAG peer switch may take into account the vLAG state on the port of the vLAG switch where it was originally received. When the packet is received on port of a vLAG trunk, then the ECP packet may be sent to the vLAG peer switch so that the peer switch may use this packet to form an association with or dissociate from the same trunk as the vLAG switch which received the packet originally from the VM.

In block 365, data traffic may flow among VMs associated with the vLAG pair of switches (switch point).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for synchronizing uplink switches with a virtual machine, the computer program product comprising a non-transitory computer readable storage medium having computer readable program code embodied therewith, the computer readable program code being configured to:
   negotiate a communication protocol capability between a server and a first switch and a second switch both of which are in communication with the server;
   identify an association of the virtual machine with the first and second switches; and
   provide a packet, including a virtual networking policy, to both the first and second switches synchronizing a virtual networking state of the first switch and the second switch with a virtual networking state of the virtual machine, wherein the virtual networking policy persists with the virtual machine as the virtual machine moves from one physical host to another physical host.

2. The computer program product of claim 1, wherein the communication protocol is the IEEE 802.1Qbg protocol.

3. The computer program product of claim 1, wherein the first and second switch form a single logical switch point.

4. The computer program product of claim 3, wherein the first switch and the second switch are configured as a virtual link aggregate group pair.

5. The computer program product of claim 3, the computer readable program code being configured to determine if a virtual station interface type of the virtual machine corresponds to a virtual station interface type of the switch point.

6. The computer program product of claim 4, the computer readable program code being configured to send the packet from the first switch to the second switch over a virtual link aggregate inter switch link.

7. The computer program product of claim 1, the computer readable program code being configured to:
   update a virtual station interface database in the first switch with the virtual networking policy; and
   update a virtual station interface database in the second switch with the virtual networking policy.

8. The computer program product of claim 1, the computer readable program code being configured to:
   disassociate the first switch from the virtual machine; and
   provide the virtual networking policy to the second switch to show the disassociation of the virtual machine from the first switch.

9. A network system, comprising:
   a server;
   a first switch connected to the server; and
   a second switch connected to the first switch and the server, wherein the first switch and the second switch form a virtual link aggregate group, and the server is configured to communicate with the first switch and the second switch under the IEEE 802.1Qbg protocol, wherein the server provides in-order delivery of upper layer protocol data units to the first switch and the second switch.

10. The system of claim 9, wherein the virtual link aggregate group defines a switch point connected to the server.

11. The system of claim 9, wherein the first switch and the second switch are connected by a virtual link aggregate group inter switch link.

12. The system of claim 9, wherein the server includes a virtual machine in communication with the first switch and the second switch.

13. The system of claim 9, including a processing unit configured to update a database in the second switch in response to an update in a database of the first switch.

14. The system of claim 13, wherein the database in the first switch and the database in the second switch include virtual networking policies.

15. The system of claim 13, wherein the processing unit is configured to disassociate the second switch from a virtual machine in response to the first switch disassociating from the virtual machine.

16. A server, comprising:
   a hypervisor;
   a virtual machine defined by the hypervisor, wherein the hypervisor uses a virtual discovery and configuration protocol to advertise virtual station interfaces to a physical network, and wherein the virtual discovery and configuration protocol enables configuration of virtual networking policies applied to the virtual machine; and
   a processing unit configured to:
     associate or disassociate the virtual machine with a virtual link aggregate group link comprising multiple switches, and
     synchronize the virtual networking policies among the multiple switches.

17. The server of claim 16, wherein the processing unit is configured to provide an edge protocol packet to each of the multiple switches, the edge protocol packet including a virtual network policy corresponding to the virtual machine.

18. The server of claim 17, wherein the edge protocol packet includes identification of a virtual link aggregation trunk corresponding to formation of an association of the virtual machine with the link aggregate group.

19. The server of claim 17, wherein the edge protocol packet includes a status corresponding to association or disassociation of the virtual machine with the virtual link aggregate group.

20. The server of claim 17, wherein the processing unit is configured to provide the edge protocol packet to the multiple switches via the IEEE 802.1Qbg protocol.

* * * * *